3,397,101
METHOD OF IMPROVING THE HEAT SEALING QUALITIES OF THERMOPLASTIC FILM ORIENTED BY STRETCHING
Gad Anders Rausing, Lund, Sweden, assignor to AB Tetra Pak, Lund, Sweden, a Swedish company
No Drawing. Filed July 22, 1963, Ser. No. 296,483
Claims priority, application Sweden, July 25, 1962, 8,204/62
1 Claim. (Cl. 156—229)

The present invention relates to a method of improving the heat sealing qualities of thermoplastic film oriented by stretching.

Within the modern packaging technique films of plastic materials are often used which offer a number of advantages compared with other materials. These plastic films are often used in so-called oriented form, in which they have certain qualities as for instance high tensile strength and low elasticity. The orientation of the plastic film is achieved by stretching it in one or several directions, usually in two directions perpendicular to each other, whereby the film, the thickness of which during the stretching naturally is reduced, does not regain its original state but remains in its stretched condition. If, however, the oriented plastic film is subjected to heat the film will shrink and in the main regain the form it had before the orientation. This effect is in certain cases harmful and especially so when it is necessary to heat seal the oriented plastic film, as the sealing zone, which is heated to a temperature higher than the softening temperature, will shrink whilst the rest of the material, which is left unheated, remains stretched. Thus the result of a heat sealing like this will with regard to appearance be rather unsatisfactory, wherefore other methods of sealing up to now have been used when sealing oriented plastic film.

Characteristic to the methods of sealing so far used is that the oriented film is lacquered or coated with emulsion coating which is sealable at a temperature substantially lower than the softening temperature of the plastic material. This lacquer sealing, however, gives a relatively poor sealing result, which in certain cases has proved quite unsatisfactory. In order to avoid these disadvantages it is suggested in accordance with the invention that the plastic material before the orienting stretching is laminated with a heat sealable thermoplastic material, which has affinity to the first mentioned material and a lower melting point than this, and that the thus formed laminated compound material is stretched under orientation into a film of the required thickness.

An example of a thermoplastic material with excellent qualities as a packaging material is polypropylene, which is resistant against fat substances and has a very high gas tightness and mechanical strength. This material, which mainly is used in the form of film, is often oriented in order to further increase its mechanical strength and reduce the thickness of the film. As mentioned above, however, it is not possible to heat seal the oriented polypropylene film without unattractive shrinking creases occurring in the sealing zone.

The polyethylene, which has many qualities in common with the polypropylene, but less strength, heat resistance, grease resistance and gas tightness, is heat sealable at a temperature which is lower than the heat sealing temperature and the softening temperature required for the polypropylene, wherefore a polyethylene coating on the oriented polypropylene film may be heat sealed against another polyethylene coating without causing shrinking of the oriented polypropylene material. A heat sealing operation between two polyethylene films gives a seam with much higher strength than a corresponding seam obtained through the previously mentioned lacquer sealings. The coating of an oriented polypropylene film with polyethylene is, however, associated with considerable difficulties and the problem has been that it has not been possible to achieve sufficient adhesion between the two types of materials when laminating at the low temperatures required to avoid shrinking of the polypropylene film. Lamination with lacquer has not been considered possible for economical reasons.

Through the method in accordance with the invention the not yet oriented polypropylene material is laminated with a polyethylene film through extrusion at sufficiently high temperature to ensure that the two films of materials are heat sealed to each other, whereby a very good adhesion is achieved. Because of the fact that the polypropylene material is not oriented no shrinking of the material will occur although the temperature is exceeding the softening temperature of the polypropylene. The compound material thus manufactured may later be stretched biaxially into orientation, whereby accordingly an oriented polypropylene film is obtained, which owing to the polyethylene coating is heat sealable without shrinking.

The above mentioned extrusion lamination may either be done as flat extrusion or also thereby that two tubes of the respective materials at the same time is extruded through concentrically arranged extruders, and that the mentioned tubes immediately after extrusion, whilst still in their plastical condition, are brought into surface contact and surface fusion, whereafter the laminated tube thus made in cooled condition is inflated by means of an overpressure applied on the inside of the tube, whereby the tube under orientation is stretched into the required material thickness.

When using the latter method in making the mentioned compound material already at the moment of extrusion a certain over-pressure is maintained on the inside of the inner of the two tubes. This over-pressure ensures that the inner tube, whilst still in its plastic condition, is pressed outwards into surface contact with the outer tube, whereby firm contact between the two tubes is achieved. As immediately after the extrusion both tubes still are plastic and thus have not had time to solidify, a fusion between the two contacting surfaces will take place, which when the tubes are solidified will give a very good adhesion between the two tubes. The laminated tube may in accordance with the invention either be cut and stretched into oriented condition in the conventional way or also it is possible to inflate the cooled laminated tube and thereby stretch it into the required material thickness.

The adhesion between the layers forming the compound material is highly dependent of the lamination temperature employed which should be kept as high as possible without causing chemical changes, as for instance carbonization, in the material. In order to get the highest possible adhesion between the layers of the compound material it is recommended in accordance with the invention to extrude the material having the higher melting point onto a previously manufactured film of the material having the lower melting point. As it is desirable to ensure an effective fusion of the surfaces the two materials thus joined may be subjected to pressure applied for instance by means of rotating rollers.

Because of the fact that the extrusion temperature of the material having the higher melting point substantially exceeds the melting point of the material having the lower melting point the temperature and heat capacity of the first mentioned material will be sufficiently high to cause the surface of the last mentioned material to melt when it comes into contact with the extruded layer, without, for this reason, effecting any chemical changes. In order to stabilize the zone of surface fusion formed the compound material may be cooled, whereby the melted zone solidifies to form a strong weld between the layers of the laminate.

As the heat sealable material layer in accordance with the invention may be very thin and yet adequate to ensure a satisfactory sealing, by far the greatest part of the compound material may consist of the orientable material, the qualities of which it was the intention to utilize. Through effecting the lamination with unstretched film the proportion between the material layers of the compound material may be chosen more freely than what would be the case, if the lamination were to be done with oriented material, for instance through lacquer lamination. In the latter case it would not for practical reasons be possible to laminate with such a thin sealing layer as the one achieved through the lamination procedure in accordance with the invention, where a relatively thin sealing layer first is laminated with an unstretched film and thereafter both the two thus laminated films are stretched together into a substantially thinner film with an extremely thin sealing layer.

Apart from the material combination mentioned in the above example, polypropylene-polyethylene, the invention may be applied on many combinations of plastic material, for example polyisobutylene-polybutylene-polyethylene, etc., where one of the materials is a stretchable film forming the required body material and the other one a heat sealable thermoplastic layer having a lower melting point than the first mentioned material.

Through the invention possibilities are thus opened for the use of a packaging material with excellent qualities, the use of which has previously been restricted because of its special and undesirable qualities in connection with heat sealing.

I claim:
1. The method of making a thermoplastic film suitable for packaging and like purposes by laminating a layer of polypropylene with a relatively thin layer of polyethylene wherein the polypropylene layer has a higher melting point than the polyethylene layer which comprises the steps of extruding a hot layer of the polypropylene material onto a premanufactured nonheated film of the polyethylene material, the surface of said film of polyethylene material being heated to sealing temperature with said extruded layer of polypropylene material by the heat within the latter, cooling the resulting laminate and thereafter stretching said laminate in the cooled state to effect orientation thereof and to simultaneously reduce the thickness of the polyethylene layer.

References Cited

UNITED STATES PATENTS

| | | | |
|---|---|---|---|
| 2,753,596 | 7/1956 | Bailey | 156—244 |
| 2,932,323 | 4/1960 | Aries | 156—244 |
| 2,956,723 | 10/1960 | Tritsch | 229—48 |
| 3,184,358 | 5/1965 | Utz | 156—244 |
| 3,187,982 | 6/1965 | Underwood et al. | 264—95 X |
| 3,262,808 | 7/1966 | Crooks et al. | 117—47 |
| 3,265,552 | 8/1966 | Berggren et al. | 156—244 |

FOREIGN PATENTS 522,838  4/1955  Italy.

EARL M. BERGERT, *Primary Examiner.*

T. R. SAVOIE, *Assistant Examiner.*